United States Patent [19]

Schwendeman et al.

[11] 3,731,200

[45] May 1, 1973

[54] SUBAUDIBLE REMOTE CONTROL TONE ENCODING SYSTEM

[75] Inventors: Robert J. Schwendeman, Pompano Beach; Thomas V. D'Amico, Fort Lauderdale; Nicholas Petrakos, Plantation, all of Fla.

[73] Assignee: Motorola, Inc., Franklin Park, Ill.

[22] Filed: Feb. 22, 1972

[21] Appl. No.: 227,747

[52] U.S. Cl. ....................325/55, 325/64, 179/41 A, 340/311

[51] Int. Cl. ....................H04b 1/00

[58] Field of Search ....................179/41 A; 325/53, 325/55, 63, 64; 340/311, 312

[56] References Cited

UNITED STATES PATENTS 3,377,435 4/1968 Lippert....................325/55

*Primary Examiner*—Albert J. Mayer
*Attorney*—Vincent J. Rauner et al.

[57] ABSTRACT

A paging system includes a transmitter for transmitting a carrier frequency signal modulated by subaudible tone signals in response to audible tone signals coupled to the transmitter from a remote point. An encoder at the remote point develops the audible tone signals which are coupled to the transmitter over standard telephone channels. At the transmitter, a circuit converts the audible tone signals to first square wave signals having the same frequency as the audible tone signals. A divider circuit divides the first square wave signals by a particular number to develop second square wave signals having the same frequency as the desired subaudible tone signals. The second square wave signals are coupled to a low pass filter which attenuates all frequencies above the subaudible tone signal frequencies and develops a sine wave having the desired subaudible tone frequency.

A frequency selector circuit may also be employed and is coupled to the divider circuit. The frequency selector circuit is operative to select the second square wave signals having a frequency above a predetermined frequency and couple them to a first filter; and is further operative to select the second square wave signals having a frequency below a predetermined frequency and couple them to a second filter. The first and second filters have low pass attenuation characteristics and are operative to filter the square wave signals coupled thereto and develop the particular subaudible tone signals therefrom for modulating the transmitter RF carrier.

19 Claims, 4 Drawing Figures

SUBAUDIBLE REMOTE CONTROL TONE ENCODING SYSTEM

BACKGROUND

In paging systems it is often desirable to use radio frequency carrier signals modulated by particular subaudible tone signals for contacting the desired pager. The subaudible tone signals are generated by a tone generator at or closely adjacent to the transmitter and coupled to the transmitter modulator for modulating the RF carrier. In certain systems, transmitter actuation and operation must be preformed from a point remote from the transmitter itself. In these systems, a telephone channel connects the remote point to the transmitter. The telephone channel may be a wire telephone line or a microwave channel. The subaudible tone signals are developed at the remote point and coupled over the telephone channel to the transmitter. Standard telephone channels substantially attenuate all subaudible signals, that is, all signals below 300 cycles, so a standard telephone channel may not be used to transmit the subaudible tone signals from a remote point. Special telephone channels may be rented from the Telephone Company which do not attenuate subaudible tone signals, however, these special telephone channels are very expensive and difficult to maintain in a condition which allows transmission of subaudible tone signals.

DC signals have also been transmitted from remote points and used at the transmitter to actuate particular subaudible tone signals. Where the remote point is quite far from the transmitter, however, DC continuity in the telephone channel cannot be provided, precluding the use of DC signalling.

SUMMARY

It is therefore an object of this invention to provide an improved paging system, employing subaudible tone signal transmission, wherein the subaudible tone signals are developed in response to signals coupled from a remote point.

Another object of this invention is to provide an improved paging system employing subaudible tone signal transmission and low cost, low maintenance standard telephone channels between a remote operating point and the transmitter.

Yet another object of this invention is to provide an improved paging system wherein audible tone signals are coupled from the remote point to the transmitter for developing the desired subaudible tone signals.

Still another object of this invention is to develop the desired subaudible tone signals from the audible tone signals coupled from the remote point over standard telephone channels.

In practicing this invention, a paging system is provided having a transmitter for transmitting a carrier frequency signal modulated by particular subaudible tone signals for contacting a desired paging receiver. Audible tone signals which are harmonics of the particular subaudible tone signals are developed at an encoder which is located at a point remote from the transmitter. These audible tone signals are coupled to the transmitter over standard telephone channels. At the transmitter, a square wave generating circuit operates in response to the audible tone signals coupled thereto to develop first square wave signals having the same frequency as the audible tone signals. A binary divider circuit divides the first square wave signals by eight and develops a second square wave signal which has the same frequency as the desired subaudible tone signals. A digital frequency selector circuit selects the second square wave signals having a frequency above 125 Hz and couples them to a first filter which has a first low pass attenuation characteristic for attenuating signals above 250 Hz. The frequency selector circuit also selects the second square wave signals having a frequency below 125 Hz and couples these square wave signals to the second filter which has a low pass attenuation characteristic for all signals above 125 cycles. The first and second filters are operative to filter the second square wave signals coupled thereto and develop the particular subaudible tone signals therefrom which are coupled to the transmitter for modulating the RF carrier signal.

THE DRAWINGS

DETAILED DESCRIPTION

Figure 1:
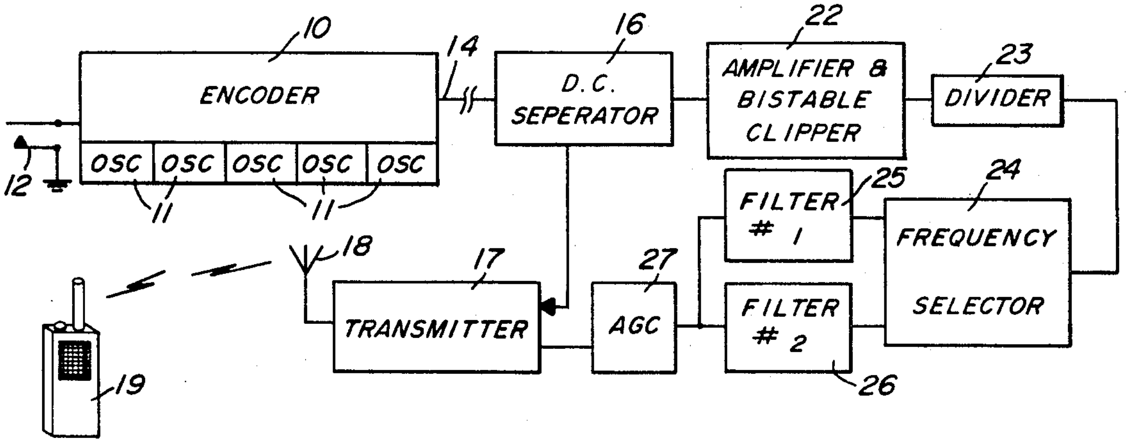
FIG. 1 is a block diagram of a subaudible remote control tone encoding system including the features of this invention.

Referring to FIG. 1, an encoder 10 includes oscillators 11 for developing audible tone signals. Audible tone signals extend in a range from 300 to 3,000 Hz and subaudible tone signals extend in a range from DC to 300 Hz. In the preferred embodiment, the subaudible tone signals employed extend from 65 to 225 Hz. The audible tone signals developed are harmonics of subaudible tone signals which are used to actuate a paging receiver. In the preferred embodiment, two sequentially received subaudible tone signals are necessary to actuate the paging receiver, so that two audible tone signals must be sequentially developed by encoder 10. Switch 12 coupled to encoder 10 is a push-to-page switch which is used to actuate encoder 10 for sending out the desired audible tone sequence. The audible tone signals are coupled to a location remote from the encoder via a standard telephone channel 14. Telephone channel 14 may be a two, or four wire telephone line, or may be a telephone microwave channel. If a four wire telephone line is used, two wires are used to couple DC signals to the remote location for actuating the transmitter, the second two wires are to couple the audible town signals to the remote location. If a two wire channel is used, the audible tone signals and DC signals are both sent over the same lines, it being understood that DC may be transmitted if the remote point is not too far removed from encoder 10. If a microwave channel is used, only audible tone signals may be transmitted. Both the two wire and four wire telephone channels, and the microwave channel will transmit audible tone signals, from 300 to 3,000 Hz, from one location to another without any variation in the attenuation of the audible tone signals within this range. That is, although all the audible tone signals in this range may be attenuated by as much as 15 db when coupled from one location to another, all signals in this frequency range will be attenuated equally. The characteristics of standard telephone channel 14 are such that all subaudible tone signals, that is, all signals below 300 cycles will be severely and unequally attenuated when couples from one location to another, with the lower frequency subaudible tone signals being attenuated to a much greater degree than the higher frequency subaudible tone signals. Standard telephone channel 14 will generally attenuate signals below 300 Hz at the rate of approximately 18 db per octave. This attenuation characteristic of standard telephone channel 14 prohibits the transmission of subaudible tones from one location to another.

At the remote location, the DC and audible tone signals coupled over telephone channel 14 from encoder 10 are coupled to a DC separator 16. DC separator 16 couples any DC signals which may be present for actuating the transmitter to transmitter 17. Transmitter 17 is actuated in response to the DC signals to develop the RF signal which is radiated from antenna 18 to all portable paging units such as unit 19.

The audible tone signals are coupled from DC separator 16 to amplifier and bistable clipper 22. Amplifier and bistable clipper 22 amplifies the audible tone signals and develops square wave signals therefrom which have the same frequency as the audible tone signals. For example, if the audible tone signals developed by encoder 10 are 1,800 Hz, the square wave signals developed by amplifier and bistable clipper 22 will be 1,800 Hz. The square wave signals are coupled from amplifier and bistable clipper 22 to divider 23 where they are divided by a particular number to produce second square wave signals having the same frequency as the desired subaudible tone signals to be transmitted. For example, 1,800 Hz square wave signals coupled to divider 23 will be divided by eight to develop 225 Hz square wave signals. The 225 Hz square wave signals are coupled to gating circuit 24. Frequency selector 24 selects all second square wave signals having a frequency in excess of 125 Hz and couples them to filter 25; and selects all second square wave signals below 125 Hz and couples them to filter 26. Filter 25 is a low pass filter having an attenuation characteristic such that it substantially attenuates all frequencies above 250 Hz. This removes all harmonics from the filter output signal so that they do not produce audio responses in other receivers on the channel, and so they do not create intermodulation products. Removing all of the harmonics of the second square wave signals coupled to filter 25 also results in a sine wave signal at the output of filter 25 which is the desired subaudible tone signal.

Filter 26 is also a low pass filter having an attenuation characteristic such that it substantially attenuates all frequencies above 125 Hz. This eliminates all harmonics of the square wave fundamental frequency from the output of filter 26, as for example, a 200 Hz harmonic, which may cause inadvertent actuation of an improper paging receiver. Removal of all the harmonics from the second square wave signals coupled to filter 26 also produces a signal at the output of filter 26 in the range between 65 to 125 Hz which is the desired subaudible tone signal. The subaudible tone signals developed by filters 25 and 26 are coupled to automatic gain control circuit 27. Automatic gain control circuit 27 acts to compensate for filter variations, and provides a constant amplitude output signal for all subaudible tone signals in the range from 65 Hz to 225 Hz. The compensated subaudible tone signals are coupled from automatic gain control circuit 27 to transmitter 17 where they are coupled to the modulator in transmitter 17 for modulating the radio frequency carrier. The modulated radio frequency carrier is coupled to antenna 18 where it is radiated to the desired pager receiver such as receiver 19.

It is to be understood that if the subaudible tone signals employed extend in a more limited range than noted above, frequency selector 24 and one filter, e.g., 26, may be eliminated. For example, if the desired subaudible tone signals extend in the frequency range from 125 to 225 Hz, the second square wave signals developed by divider 23 may be coupled directly to a low pass filter, such as filter 25. In this embodiment, filter 25 will remove all harmonics of the second square wave signals coupled thereto thus producing a sine wave signal at the output of filter 25 which is the desired subaudible tone signal.

Figure 3:
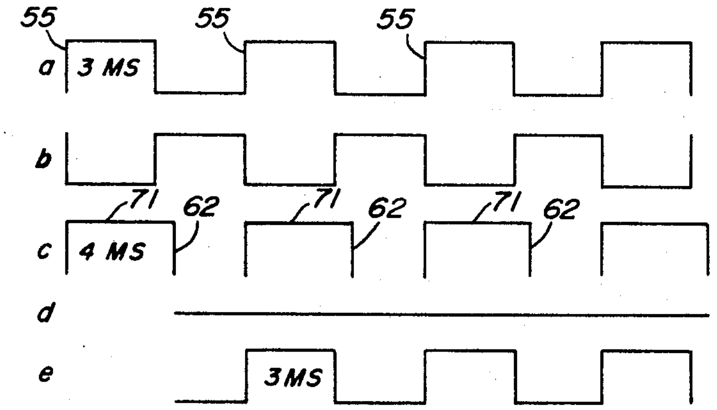
FIG. 3 shows waveforms for signals at certain points in the circuitry shown in FIG. 2.
Figure 4:
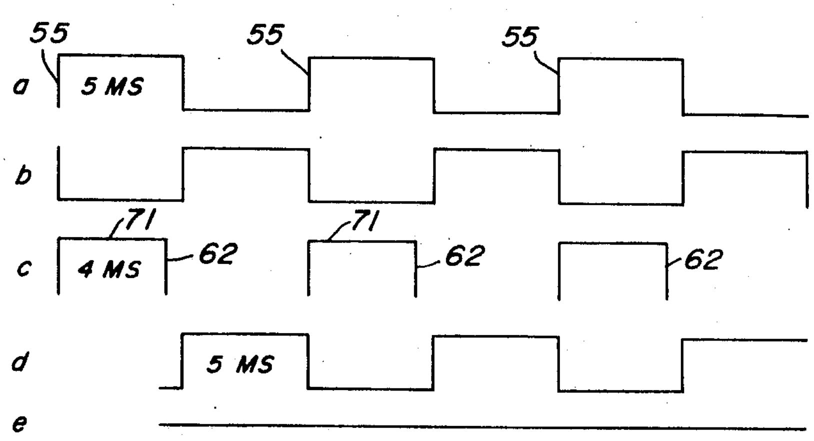
FIG. 4 shows waveforms at certain points in the circuitry shown in FIG. 2.
Figure 2:
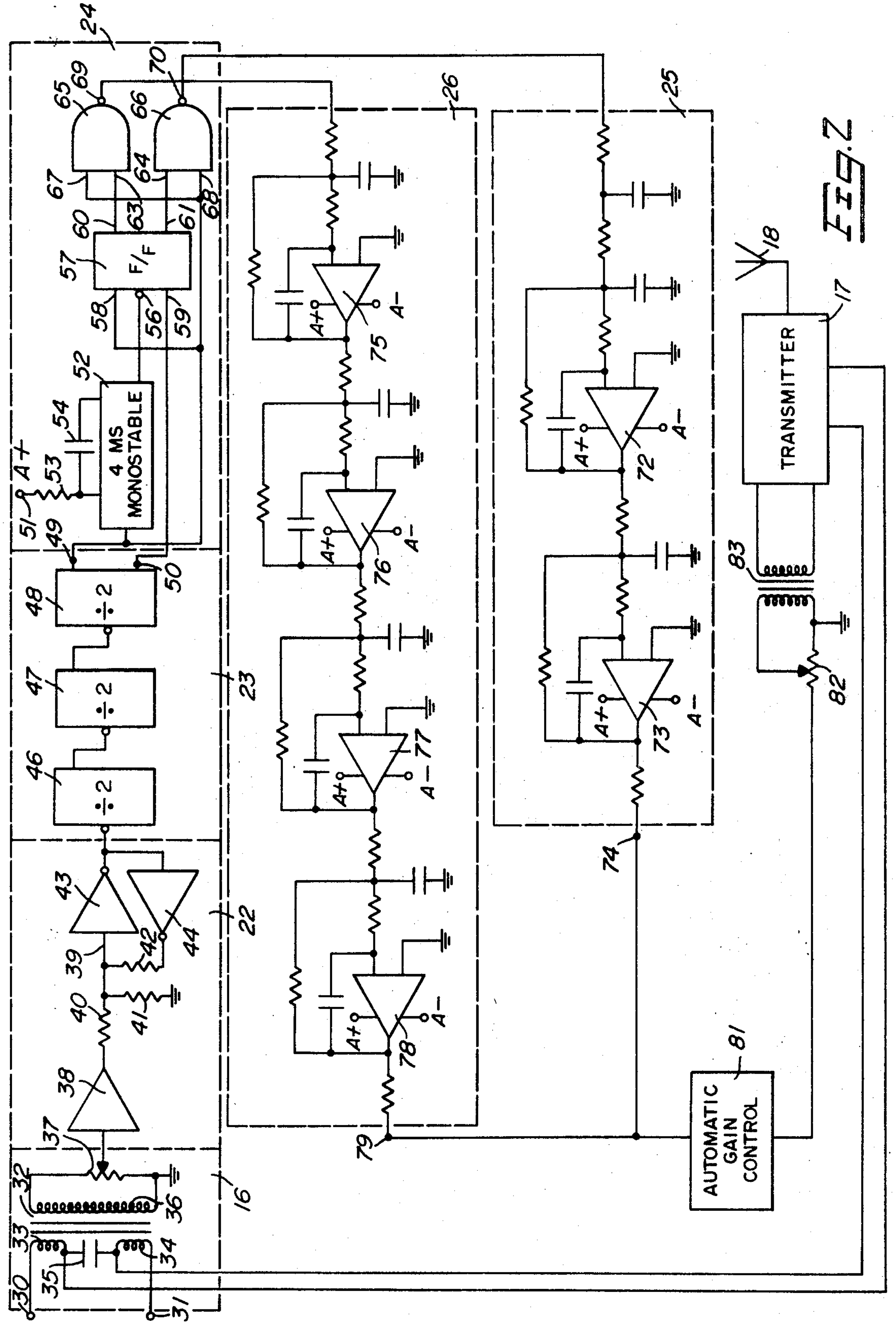
FIG. 2 is a schematic and block diagram of the circuitry at the transmitter for developing and selecting the desired subaudible tone signals.

Referring to FIG. 2, the circuitry located at the transmitter location is shown in greater detail. Audible tone signals coupled from encoder 10 over telephone channel 14, are coupled to terminals 30 and 31 of transformer 32. Transformer 32 is represented as DC separator 16 in FIG. 1. Primary windings 33 and 34 of transformer 32 are serially coupled together through capacitor 35. The DC signals coupled from encoder 10 to transformer 32 for keying the transmitter will be developed across capacitor 35 and coupled to transmitter 17 actuating the transmitter. The audible tone signals coupled from encoder 10 to transformer 32, are coupled from primary windings 33 and 34 to secondary winding 36. The audible tone signals are coupled from secondary winding 36 through potentiometer 37 to amplifier 38 in amplifier and bistable clipper 22. Amplifier 38 in the embodiment shown amplifies the audible tone signals by 30 db in order to compensate for the attenuation resulting in telephone channel 14. The amplified audible tone signals are coupled from amplifier 38 to Schmitt trigger 39 in amplifier and bistable clipper 22. Schmitt trigger 39 is shown functionally by resistors 40, 41 and 42 and amplifiers 43 and 44. Schmitt trigger 39 will change states with every change in sign of the audible tone signals coupled thereto, producing first square wave output signals whose frequency is the same as the audible tone signals coupled thereto. The first square wave signals are coupled from amplifier and bistable clipper 22 to divider 23. Divider 23 includes three serially connected bistable multivibrators, or flip-flops, 46, 47 and 48, which are each connected to divide the signals coupled thereto by two. All three connected in series as shown, divide the first square wave signals by eight, producing second square wave signals at terminal 49 of flip-flop 48 whose frequency is one-eighth of the first square wave signal frequency. Two outputs 49 and 50 are provided at flip-flop 48. The second square wave signals are developed at terminal 49 and are binary signals which shift between two predetermined levels or states. These states are defined as a high or "1" state, and a low or "0" state. Second square wave signals are also produced at terminal 50. The square wave signals are the same as that developed at terminal 49, however, they are inverted 180°. That is, when a "1" state exists at terminal 49, a "0" state exists at terminal 50. FIG. 3a is a representation of the square wave signals developed at terminal 49, and FIG. 3b is a representation of the square wave signals developed at terminal 50. Each half cycle of the square wave signals in FIGS. 3a and 3b is approximately 3 milliseconds. The frequency of square wave signals shown in FIGS. 3a and 3b is then approximately 167 Hz. FIGS. 4a and 4b also show representations of the square wave signals at terminals 49 and 50, however, these square wave signals have a half cycle of approximately 5 milliseconds. The frequency of these square wave signals is then approximately 100 Hz. The signals in FIGS. 3a and 3b, and FIGS. 4a and 4b are all then within the frequency range of the desired subaudible tone signals.

The second square wave signals developed at terminal 49 are coupled to monostable multivibrator 52 in frequency selector 24. Each leading edge, or positive going transition 55 of the second square wave signal coupled from terminal 49 will cause monostable multivibrator 52 to actuate and develop square wave clock pulses 71 having a 4 millisecond duration. The 4 millisecond clock pulses 71 are represented in FIGS. 3c and 4c. Resistor 53 and capacitor 54, coupling monostable multivibrator 52 to A+ potential at terminal 51, determine the period of clock pulses 71. A 4 millisecond pulse is equivalent to ½ cycle of a signal of 125 Hz. Four milliseconds then is selected as it is approximately in the center of the frequency range of the subaudible tone signals. Four milliseconds is also selected as the period of monostable multivibrator 52 because all signals below 125 Hz have second harmonic components which fall within the range of the higher frequency subaudible tone signals to be used in transmitting paging signals. The second harmonics must be eliminated from the transmitted signals so as to prevent inadvertent false operation of an undesired paging receiver.

Clock pulses 71 from monostable multivibrator 52 are coupled to clock input 56 of bistable multivibrator, or flip-flop 57. The second square wave signals developed at terminal 49 are coupled to gated input 58 of flip-flop 57; and the inverted second square wave signals developed at terminal 50 are coupled to gated input 59 of flip-flop 57. The negative going trailing edge 62 of clock pulses 71 from monostable multivibrator 52 gates flip-flop 57, causing the signals appearing at terminals 58 and 59 at that point in time to be coupled through flip-flop 57 to output terminals 60 and 61. The signals developed at terminals 60 and 61 in response to one clock pulse 71 will be maintained thereat until the negative going trailing edge 62 of the next clock pulse 71 from monostable 52 allows the signals at terminals 58 and 59 to again be sampled. The signals developed at terminals 60 and 61 of flip-flop 57 are coupled to terminals 63 and 64, respectively of NAND gates 65 and 66. The second inputs to each NAND gate are shown as 67 and 68, respectively, and are coupled to terminal 49 of divider 23.

NAND gates 65 and 66 each operate such that they will develop a "0" or low output, if the signals coupled to both inputs are highs, or "1's." If either or both of the signals coupled to the inputs of the NAND gate are low signals or "0's, " the output will be a high signal, or a "1." The operation of frequency selector 24 is such that second square wave signals having a frequency greater than 125 cycles will be reproduced at output terminal 70 of NAND gate 66, and second square wave signals having a frequency of less than 125 Hz will be reproduced at output terminal 69 of NAND gage 65.

The operation of NAND gates 65 and 66, in response to the signals shown in FIGS. 3a, *b* and *c* is as follow. At the termination of the first 4 millisecond monostable pulse shown in FIG. 3c, a "0" is developed at output 60 of flip-flop 57. This "0" is developed in response to the "0" state of the second square wave signal shown in FIG. 3a at that point in time. The "0" signal is coupled to input 63 of NAND gate 65. Output 61 of flip-flop 57 develops a "1" because the signal coupled from terminal 50 to terminal 59 is the opposite of the signal at terminal 49 at that point in time. The "1" is coupled to input 64 of NAND gate 66. These levels are maintained until the negative going trailing edge 62 of the succeeding 4 millisecond clock pulse 71 again clocks flip-flop 57. Prior to the occurrence of the negative going trailing edge 62 of the clock pulse 71 the second square wave signal coupled from terminal 49 will change to a "" state. As both inputs to NAND gate 66 have "1's" thereat, at that point in time, the output terminal 70 of NAND gate 66 will switch to the low or "0" state. The second square wave signal coupled from terminal 49 will change to the "0" state before termination of the next clock pulse 71, causing output terminal 70 to switch to the " 1" state. As can be seen by reference to FIGS. 3a, *b* and *c*, each subsequent clock pulse 71 will cause output terminals 60 and 61 of flip-flop 57 to maintain the same signals thereat. Output terminal 70 of NAND gate 66 will therefore switch between the high and low states at the same rate as, and in accordance with the state of the second square wave signals coupled from terminal 49. As input terminal 63 of NAND gate 65 continually has a low, or "0" state thereat, its output will always be maintained at a high or "1" state and will not switch between the high and low states at the rate of the second square wave signals coupled thereto. FIG. 3d shows the output signals developed at terminal 69 of NAND gate 65 in response to second square wave signals having a frequency greater than 125 Hz such as is represented in FIG. 3a. FIG. 3e shows the output signals developed at terminal 70 of NAND gate 66 in response to second square wave signals having a frequency greater than 125 Hz.

Should a lower frequency second square wave signal be developed at terminal 49, as for example, a 100 Hz signal such as shown in FIG. 4a, the signal developed at terminal 60 of flip-flop 57 at the clock time will be a high or "1," and the signal developed at terminal 61 of flip-flop 57 will be a low of "0." Each succeeding clock signal will maintain the same signals at the output of flip-flop 57. Input terminal 64 of NAND gate 66 will therefore always be maintained at a low or "0" state, resulting in output terminal 70 of NAND gate 66 being maintained at a continuously high or "1" state. However, input terminal 63 of NAND gate 65 will be maintained at a high or "1" state, so that output terminal 69 of NAND gate 65 will switch between the high or "1" state and the "0" or low state in accordance with the second square wave signal coupled to input terminal 67 of NAND gate 65 from terminal 49. The signal developed at output terminal 69 of NAND gate 65 will therefore have the same frequency as the signal developed at terminal 49 of divider 23. FIG. 4*d* shows the output signals developed at terminal 69 of NAND gate 65 in response to second square wave signals having a frequency less than 125 Hz such as is represented in FIG. 4*a*. FIG. 4*e* shows the output signals developed at terminal 70 of NAND gate 66 in response to second square wave signals having a frequency less than 125 Hz.

Again, it is to be understood that AND gates may be employed in place of NAND gates 65 and 66. If AND gates are employed the output signal developed will be 180° out of phase with the signals shown in FIGS. 3*a* and 4*d*. Furthermore, any logic circuit may be employed in place of NAND gates 65 and 66 which performs the same functions as explained above.

The second square wave signals having a frequency greater than 125 Hz are coupled from output terminal 70 of NAND gate 66 to low pass filter 25. Low pass filter 25 includes two series connected low pass operation amplifier active filters 72 and 73. These low pass operational amplifier active filters substantially attenuate all frequencies greater than 250 Hz. This eliminates all harmonic components from the second square wave signal coupled thereto, producing an output signal at terminal 74 which is a sure sine wave signal that is the desired subaudible tone signal.

The second square wave signals having a frequency less than 125 Hz are coupled from output terminal 69 of NAND gate 65 to filter 26. Filter 26 includes a plurality of serially connected low pass operational amplifier active filters 75 75, 77 and 78. Filter 26 has a low pass attenuation characteristic such that it substantially attenuates all signals greater in frequency than 125 Hz. This removes all harmonics of the second square wave signal, including the third harmonic which could, if transmitted inadvertently, page an improper paging receiver, and produces an output signal at terminal 79 which is a pure sine wave signal having the frequency of the desired subaudible tone signals. In addition, the harmonics are in the audible frequency range of paging receivers on the channel and therefore would interfere with simultaneous voice communication.

The subaudible tone signals developed at either of the output terminals 74 and 79 of filters 25 and 26, respectively, are coupled to automatic gain control amplifier 81 which amplifies the signals to a constant level in order to compensate for the variations in filters 25 and 26. The subaudible tone signals are coupled from automatic gain control circuit 81 through potentiometer 82 and transformer 83 to transmitter 17. At transmitter 17, the subaudible tone signals are coupled to the modulator where they are employed to modulate the RF carrier signal which is radiated from antenna 18 to the desired portable paging receiver.

As can be seen, a subaudible tone encoded paging system has been provided employing subaudible tone signal transmission which develops the subaudible tone signals in response to audible tone signals coupled from a remote point. This allows operation from a remote point over standard telephone channels thus reducing the system maintenance and expense.

We claim:

1. In a paging system including a transmitter for transmitting a carrier frequency signal modulated by particular subaudible tone signals developed thereat in response to particular audible tone signals coupled to said transmitter from a point remote from said transmitter over a standard telephone channel which provides substantial attenuation of said subaudible tone signals, and substantially no attenuation of said audible tone signals, the combination including; encoder means operative to develop said particular audible tone signals, said audible tone signals being harmonics of said particular subaudible tone signals, said telephone channel being coupled to said encoder means and said transmitter for coupling said audible tone signals to said transmitter, said transmitter including circuit means operative in response to said received signals audible tone signals to develop first square wave signals having the same frequency as said audible tone signals, divider means coupled to said circuit means and operative to divide said first square wave signals and develop second square wave signals having the same frequency as said subaudible tone signals, frequency selector means coupled to said divider means and having at least a first and second output, said frequency selector means operative to select second square wave signals having a frequency above a predetermined subaudible tone signal frequency and couple same to said first output, said frequency selector means being operative to select second square wave signals having a frequency below said predetermined subaudible tone signal frequency and couple same to said second output, first filter means having a first low pass attenuation characteristic coupled to said first output, and second filter means having a second low pass attenuation characteristic coupled to said second output, said first and second filter means operative to filter said square wave signals coupled thereto and develop said particular subaudible tone signals therefrom.

2. The paging system of claim 1 wherein said subaudible tone signals extend in a range from 65 Hz to 225 Hz, and said audible tone signals extend in a range from 300 Hz to 3,000 Hz.

3. The paging system of claim 2 wherein said circuit means includes coupling means coupled to said telephone channel for receiving said audible tone signals therefrom, amplifier means coupled to said coupling means and operative to amplify said audible tone signals coupled thereto, bistable clipping means coupled to said amplifier means and responsive to said amplified audible tone signals coupled thereto to develop said first square wave signals.

4. The paging system of claim 3 wherein said divider means includes digital divider circuit means operative in response to said first square wave signals coupled thereto to divide by a particular number.

5. The paging system of claim 4 wherein said first filter means substantially attenuates signals greater in frequency than said subaudible tone signals, and said second filter means substantially attenuates signals greater in frequency than said predetermined subaudible tone signal frequency.

6. The paging system of claim 5 wherein said second square wave signal is a binary signal having first and second states, and wherein said selector means includes clock means coupled to said divider means and responsive to said second square wave signals coupled thereto to develop clock signals, sampling means coupled to said divider means and said clock means, said sampling means responsive to said clock signals to sample the state of said second square wave signals and develop sampling signals for indicating the state of said square wave signals, and gating means coupled to said sampling means and said divider means, said gating means operative in response to particular combinations of said sampling signals and said second square wave signals coupled thereto to gate said second square wave signals to one of said frequency selector means first and second outputs.

7. The paging system of claim 5 wherein said second square wave signals are binary signals having first and second states and wherein said selector means includes monostable multivibrator means coupled to said divider means and operative in response to said second square wave signals changing from said first to said second state to develop clock pulses having a predetermined period equal to the period of said predetermined frequency, bistable multivibrator means coupled to said divider means and to said monostable multivibrator means, said bistable multivibrator means operative in response to each of said clock pulses coupled thereto to develop a first signal for indicating the state of said second square wave signals coupled thereto, and a second signal for indicating the opposite state from the state of said square wave signal coupled thereto, and first and second NAND gate means each having a first input coupled to said divider means for receiving said second square wave signals therefrom, said first NAND gate means having a second input coupled to said bistable multivibrator means for receiving said first signal therefrom, said second NAND gate second input coupled to said bistable multivibrator for receiving said second signal therefrom, said first and second NAND gate means being operative to develop a signal corresponding to said first state of said second square wave signal when said signals coupled to said first and second inputs both correspond to said second state, said first and second NAND gate means being operative to develop a signal corresponding to said second state of said second square wave signal at all other times.

8. The paging system of claim 6 wherein said coupling means is an input transformer, and said bistable clipping means is a Schmitt trigger.

9. The paging system of claim 8 wherein said divider means divides by eight.

10. The paging system of claim 6 wherein said first and second filter means each include a plurality of operational amplifiers serially connected, and said predetermined frequency is approximately 125 Hz.

11. The paging system of claim 10 wherein said transmitter includes modulator means for modulating the RF carrier signal with said subaudible tone signals, and further including automatic gain control circuit means coupling said first and second filter means to said modulator means, said automatic gain control means operative to maintain said subaudible tone signals at a constant amplitude.

12. The paging system of claim 11 wherein said telephone channel is a telephone wire line.

13. The paging system of claim 11 wherein said telephone channel is a microwave channel.

14. In a paging system including a transmitter for transmitting a radio frequency (RF) carrier signal modulated by particular subaudible tone signals developed thereat in response to particular audible tone signals coupled to said transmitter from a point remote from said transmitter over a standard telephone channel which provides substantial attenuation of said subaudible tone signals, and substantially no attenuation of said audible tone signals, the combination including; encoder means operative to develop said particular audible tone signals, said audible tone signals being harmonics of said particular subaudible tone signals, said telephone channel being coupled to said encoder means and said transmitter for coupling said audible tone signals to said transmitter, said transmitter including circuit means operative in response to said received audible tone signals to develop first square wave signals having the same frequency as said audible tone signals, divider means coupled to said circuit means and operative to divide said first square wave signals and develop second square wave signals having the same frequency as said subaudible tone signals, and filter means coupled to said divider means and having a predetermined low pass attenuation characteristic, said filter means operative to filter said square wave signals coupled thereto and develop said particular subaudible tone signals therefrom.

15. The paging system of claim 14 wherein said subaudible tone signals extend in a range from 65 Hz to 225 Hz, and said audible tone signals extend in a range from 300 Hz, to 3,000 Hz.

16. The paging system of claim 15 wherein said filter means substantially attenuates signals greater in frequency than said subaudible tone signals.

17. The paging system of claim 16 wherein said divider means includes digital divider circuit means operative in response to said first square wave signals coupled thereto to divide by a particular number and to develop said second square wave signals.

18. The paging system of claim 17 further including frequency selector means coupled to said digital divider circuit means and having at least a first and second output, said frequency selector means being operative to select second square wave signals having a frequency above a predetermined subaudible tone signal frequency and couple same to said first output, said frequency selector means being operative to select second square wave signals having a frequency below said predetermined subaudible tone signal frequency and couple same to said second output, said filter means including first low pass filter means coupled to said frequency selector means first output and second low pass filter means coupled to said frequency selector means second output, said first and second filter means operative to filter said square wave signals coupled thereto and develop said particular subaudible tone signals therefrom.

19. The paging system of claim 18 wherein said second square wave signals are binary signals having first and second states, and wherein said selector means includes clock means coupled to said digital divider circuit means and responsive to said second square wave signals coupled thereto to develop clock signals, sampling means coupled to said digital divider circuit means and said clock means, said sampling means responsive to said clock signals to sample the state of said second square wave signals and develop sampling signals for indicating the state of said square wave signals, and gating means coupled to said sampling means and said divider means, said gate means operative in response to particular combinations of said sampling signals and said second square wave signals coupled thereto to gate said second square wave signals to one of said frequency selector means first and second outputs.

* * * * *